United States Patent [19]

Wurzburg et al.

[11] 3,977,897

[45] Aug. 31, 1976

[54] PROCESS FOR PREPARING A NON-CHEMICALLY INHIBITED STARCH

[75] Inventors: Otto B. Wurzburg, Whitehouse Station; Leo H. Kruger, Kendall Park, both of N.J.

[73] Assignee: National Starch and Chemical Corporation, Bridgewater, N.J.

[22] Filed: Sept. 8, 1975

[21] Appl. No.: 611,136

[52] U.S. Cl. .................................. 127/71; 127/32; 127/70; 536/102
[51] Int. Cl.² ......................................... C13L 1/08
[58] Field of Search ............... 127/33, 71, 70, 320; 260/233.3 R

[56] References Cited
UNITED STATES PATENTS

| | | | |
|---|---|---|---|
| 2,702,755 | 2/1955 | Chaney | 127/70 X |
| 2,720,465 | 10/1955 | Fetzer | 127/70 X |
| 2,754,232 | 7/1956 | Wetzstein | 260/233.3 R |
| 2,806,026 | 9/1957 | Evans | 260/233.3 R |
| 3,117,892 | 1/1964 | Patel | 127/71 X |
| 3,434,880 | 3/1969 | Kircher | 127/70 |
| 3,463,668 | 8/1969 | Evans | 127/70 X |
| 3,553,195 | 1/1971 | Jarowenko | 260/233.3 R |
| 3,706,731 | 12/1972 | Hjermstad | 260/233.3 R |
| 3,751,410 | 8/1973 | Caracci | 260/233.3 R |

*Primary Examiner*—Morris O. Wolk
*Assistant Examiner*—Sidney Marantz

[57] ABSTRACT

A non-chemically inhibited starch is prepared by controlled heating at a specified pH of an aqueous suspension of an amylose-containing starch in intact granule form and an inorganic salt effective in raising the gelatinization temperature of the starch.

9 Claims, No Drawings

PROCESS FOR PREPARING A NON-CHEMICALLY INHIBITED STARCH

BACKGROUND OF THE INVENTION

This invention relates in general to a novel process for the preparation of non-chemically inhibited starch, and the products thereof.

A starch product is said to be "inhibited" when the granule is in some way strengthened so that in cooking some or all of the following is found:

1. The maximum swelling of the starch granule is lower. The hot viscosity is usually lower for moderate inhibition, but is somewhat higher for very low inhibitions.
2. If the starch cook is normally cohesive or phlegmy, this is reduced or eliminated.
3. If the original cook is clear, the inhibited product tends to be cloudy.
4. If the viscosity of the cook is measured as a function of time, e.g., by a Brabender Viscograph, the time of the peak viscosity is delayed or the peak may be entirely eliminated. The rate of increase in viscosity before the peak and the rate of decrease after the peak will both be lower for the inhibited starch.

These properties will be further discussed below.

In general, the inhibiting treatment increases the resistance of starch pastes to the thinning effects of prolonged agitation, heating or exposure to acids or alkalies. Thus, the sharp rise to a peak viscosity followed by a rapid drop in viscosity given by some starches (e.g., potato, tapioca) can be eliminated by inhibiting the starch. This property is of interest in thickeners for canned foods where loss of viscosity is undesirable. It is also of importance where cooked starches are subjected to prolonged pumping and heating operations in processing where a uniform viscosity must be maintained.

A slightly inhibited starch has a slower rate of gelatinization making the viscosity increase to a maximum more gradual, the extent of this change being related to the degree of inhibition. This property is useful where a delayed thickening on heating is desired, as in the retorting of canned foods. Additionally, a slight degree of inhibition is particularly valuable in reducing the rubbery, cohesive character of tapioca and potato starch pastes to a smooth, creamy texture. These products, prepared with bifunctional reagents acceptable for modifying food starches, are useful in pie fillings, salad dressings and puddings.

As the degree of inhibition of ungelatinized starch granules is increased, the rate of swelling is lowered. This can be carried to a point (about one crosslink in 20 glucose units) where the inhibited starch granules is completely resistant to normal cooking temperatures and can even be sterilized by auto-claving without becoming gelatinous. A product of this type is useful as a surgical dusting powder, particularly since any residual starch left in an incision is absorbed.

The normal way of inhibiting starch is to crosslink the starch granules. To this end starch granules are usually chemically treated at a high alkaline pH with bifunctional reactants that react with the hydroxy groups of two or more starch molecules, thereby resulting in a strengthened granule. The bifunctional reagents typically utilized in these reactions include epichlorohydrin, linear dicarboxylic acid anhydrides, organic dihalides, divinyl sulfone, phosphorous oxychloride and soluble metaphosphates. Formaldehyde also inhibits starch, but only under acid conditions. Chemical inhibition is ultimately accomplished by forming reinforcing links between molecules in the granules, thereby adding to the hydrogen bonding forces which hold the granules together. In these known methods, the bifunctional reagent is incorporated into the inhibited starch product.

Another way of inhibiting starch is the heat-moisture treatment of starch as described by L. Sair in "Methods In Carbohydrate Chemistry", Vol. IV (Starch), R. L. Whistler, Ed., Academic Press, N. Y. (1964) p. 283–285, in an article entitled "Heat-Moisture Treatment of Starches". This non-chemical method of producing inhibited starch granules is especially directed towards root starches. This method, however, requires use of high pressure equipment and according to one variation of the method the moisture contents of the starches are adjusted to from 18 to 27%.

It is an object of this invention to provide a novel and commercially practicable process of preparing an inhibited starch. It is a further object to provide such a process which inhibits the starch without introducing chemical additives and thus permit greater use of the inhibited starch in foods and pharmaceuticals. Various related objects and advantages of this invention will become apparent from the following description thereof.

SUMMARY OF THE INVENTION

The present invention provides a process for preparing a non-chemically inhibited starch wherein an amylose containing starch in granule form is suspended in water together with a selected inorganic salt. The aqueous suspension of starch and salt is heated at moderate temperatures for periods of time ranging from about 0.5 to 30 hours while the pH of the dispersion is maintained at from pH 3.0 to 9.0

DETAILED DESCRIPTION OF THE PREFERRED EMBODIMENT

The initial step of the process of this invention is the preparation of a suspension comprising an amylose-containing starch in intact granule form, an inorganic salt effective in raising the gelatinization temperature of the starch (without entering into a chemical reaction therewith) and water.

The starch bases useful in the process of this invention must be in intact granule form. They may be derived from any amylose-containing sources including potato, sweet potato, tapioca, regular corn, wheat, rice, sago, sorghum or the like, and include the conversion products derived from any of such sources, including, for example, oxidized starches prepared by treatment with oxidants (such as sodium hypochlorite) and fluidity or thin boiling starches prepared by enzyme conversions or mild acid hydrolysis. The term "starch" is thus seen to include any amylaceous starch whether untreated or chemically modified.

It is well known that starch is generally composed of two fractions: a linear fraction known as amylose and a branched fraction known as amylopectin. Each starch type (e.g., corn, potato, tapioca) contains these two fractions in a ratio characteristic of that starch. Starches with amylose concentrations ranging approximately from 18 to 30 percent of the total starch weight are the preferred starch bases in the process of this invention. Most preferred are starches commonly referred to as the root starches such as potato, tapioca and achira (usually called canna starch). Starches with amylose concentrations greater than 30 percent of the total starch weight, including the so-called high amylose starches, are useful starch bases in the process of this invention, but the degree of inhibition achieved is difficult to determine because of the paste characteristics of these starches. Amylose-containing starches having amylose concentrations less than 18 percent of the total starch weight should also be useful in the process of this invention, but the starches which are essentially 100 percent amylopectin with little, if any, amylose (e.g., waxy maize) are not. In summary, both cereal and root starches are inhibited by the process described herein but the effects are more observable for the root starches. Best results are achieved with starches which contain appreciable amounts of amylose and preferably 18 to 30 percent amylose based on the total starch weight. Waxy maize, however, which is sometimes referred to as a root starch, is not inhibited by this process because of the absence of amylose.

The suspension should contain sufficient water to suspend the starch granules, preferably about 110 to 220 parts water per 100 parts by weight of starch. About 150–200 parts water per 100 parts starch are preferred to permit good agitation, especially for tapioca, potato and certain other starches.

The presence of the salt in the aqueous suspension of ungelatinized starch raises the gelatinization temperature of the starch so that the suspension may be heated to high temperatures without causing the starch granules to swell and rupture yielding a gelatinized product. (The use of lower temperatures in the process does not permit inhibition of the starch in a commercially practicable period of time.) While any inorganic salt which is effective to raise the gelatinization temperature without chemically attaching itself to the starch may be used, the preferred salts are sodium sulfate, ammonium sulfate, magnesium sulfate, potassium sulfate, sodium chloride, sodium phosphate, potassium chloride, potassium phosphate, ammonium chloride and ammonium phosphate. Sodium sulfate is especially preferred.

About 10 to 60 parts, and preferably 20 to 50 parts, of salt per 100 parts by weight of starch are useful in the process of this invention. Of course the amount of salt required will depend especially on the particular starch employed herein, in addition to such other factors as the chosen salt, the ratio of water to starch, the holding temperature, the holding time and the desired degree of inhibition. As a general rule, the inhibition process is slowed by the addition of salt, provided the holding temperature is held constant. An excess amount of salt prevents the absorption of water into the starch granule, and it is believed that the absorption of water by the starch granule is necessary in order to rearrange the linear amylose fraction and to produce the inhibition. On the other hand, the presence of the salt raises the gelatinization temperature, and hence permits a higher holding temperature which quickens the inhibition process. Therefore, the optimum salt concentration represents a compromise between competing considerations.

The pH level of the dispersion is maintained at about 3 to 9, and preferably at about 4 to 7. Extremely acid systems (i.e. pH levels lower than about 3) degrade the starch, while highly alkaline systems (i.e., pH levels above 9) retard the inhibition reaction. The maintenance of the proper pH range is usually assured by adjusting the pH to about 5.0 to 6.0 before heating. Buffers can also be used to maintain the pH at an appropriate level but in most cases no adjustment of pH is necessary.

The temperatures useful in the process of this invention range from 50°C. to 100°C., with temperatures of 60°C. to 90°C. being preferred. The time period for heating the dispersion of starch at such temperatures to produce the desired inhibition depends on such factors as the particular salt utilized in the process, the nature of the starch, the temperature of heating and the degree of inhibition sought. Naturally, other factors being constant, shorter heating periods may be used at higher temperatures and longer heating periods may be used to provide a greater degree of inhibition. For example, a one hour heating period at 95°C using 50 percent sodium sulfate suffices to moderately inhibit potato starch. The preferred heating period is 0.5 to 30 hours. The heating is preferably performed under atmospheric pressure.

The recovery step is entirely conventional. After the inhibition reaction has proceeded to the desired degree of inhibition, recovery of the inhibited starch is initiated by washing the starch product to remove the salt. The treated starch may then be dried and recovered by any known means, e.g., air drying, drying in belt driers or by flash or spray drying.

While an inhibited starch prepared according to the process of this invention may be used in any conventional inhibited starch application, the absence of chemical additives therein additionally permits its incorporation in processed foods, pharmaceuticals, and other products where the presence of chemical additives is undesirable or to be minimized. For example, it is highly useful in dry mix products (primarily in foods such as salad dressings and puddings), canned pie fillings and other applications where chemically inhibited starches are now used.

The following examples illustrate the efficacy of this invention. All quantities are given in parts based on the weight of starch used.

In the examples the viscosity of the cooked pastes derived from the treated starch product is used to determine the inhibition level of the treated starch products. A Brabender Viscograph is typical of the apparatus usually utilized to make such viscosity determinations. This instrument traces a continuous graphic record of the viscosity of the test sample, thereby providing viscosity data during the heating, holding and cooling cycles. From the resultant graph the degree of inhibition of the starch product may be determined. Thus, for example, uninhibited starch products will exhibit relatively high peak viscosities before and during the holding cycle (30 minutes at 95°C.). While lightly inhibited starches also exhibit high peak viscosities, they do not show the marked viscosity decrease during the holding period which is indicative of the uninhibited starch. On the other hand, moderately inhibited products do not exhibit any peak viscosities, but do undergo viscosity increases during the holding period. Finally, highly inhibited starches show neither a viscosity peak nor a viscosity increase on standing.

In the Brabender procedure, 23 g. of anhydrous starch is mixed with water so as to have a total weight of 460 g. The pH is adjusted, if necessary, to 6.0 – 6.5 in the starch-water mixture. The Brabender is set so as to heat rapidly to 95°C., maintain the temperature for a 30 minute holding period, and thereafter to cool under ambient conditions. The time required for the sample to gelatinize in the Brabender is noted. All viscosities are measured in Brabender Units (B.U.), one B.U. being equal to about 1 centipoise.

EXAMPLE I

This example illustrates the preparation of inhibited starches utilizing various salts according to the process of this invention.

For each sample, 100 parts of potato starch are suspended in 150 parts of water containing a given quantity of a salt. The pH is then adjusted to 6.0 and the mixture placed in a sealed tumbler at 70°C. for 19 hours. Afterwards, the starch is thoroughly washed to remove all residual salt and subsequently air dried.

Four samples were prepared using the salts listed below in the specified amounts:

| Sample | Salt |
|---|---|
| A | 15 parts of sodium sulfate |
| B | 26 parts of magnesium sulfate heptahydrate |
| C | 15 parts of potassium sulfate |
| D | 25 parts of ammonium sulfate |

The treated potato starch samples were then shown to be inhibited by comparing a Brabender Viscograph evaluation for each with similar evaluation made on a control sample of untreated, ungelatinized potato starch, the results being indicated in Table I.

TABLE I

| Test sample | A | B | C | D | Untreated |
|---|---|---|---|---|---|
| Gelatinization time (min.) | 10.5 | — | — | — | 8.5 |
| Peak viscosity | none | none | none | none | 1620 |
| Peak time (min.) | — | — | — | — | 13.8 |
| Visc/0 min. at 95°C. | 80 | 410 | 640 | 690 | 1615 |
| Visc/15 min. at 95°C. | 690 | —* | 1820 | 1235 | 915 |
| Visc/30 min. at 95°C. | 800 | 1295 | 2130 | 1340 | 650 |

*Not recorded

All treatments inhibited the potato starch. Sample A indicated inhibition to the greatest degree.

EXAMPLE II

This example shows the effect of heating the starch slurry in the absence of salt.

100 Parts of potato starch are suspended in 150 parts water. In complete contrast to the tests made on Samples A – D in Example I, no salt is added. The pH is adjusted to 6.0 and the mixture is placed in a sealed tumbler at 60°C. for a fixed holding period. (Potato starch gelatinizes if heated to 70°C. without salt.)

A Brabender comparison of each of two samples given a different hold period with an untreated control sample was used to show the resulting inhibition, as indicated in Table II.

TABLE II

| Test Sample | A | B | Untreated |
|---|---|---|---|
| Holding period (hours) | 48 | 86 | 0 |
| Gelatinization time (min) | 9.8 | 9.5 | 8.5 |
| Peak Viscosity | 2535 | 2210 | 1620 |
| Peak time (min) | 19.2 | 30 | 13.8 |
| Visc/0 min. at 95°C. | 1230 | 720 | 1615 |
| Visc/15 min. at 95°C. | 2010 | 2200 | 915 |
| Visc/30 min. at 95°C. | 1550 | 2085 | 650 |

Heating without salt results in a small amount of inhibition, as indicated by later peak time and higher final viscosity of Samples A and B. Even Sample B, which was heated for 86 hours, is much less inhibited than any of the Samples A – D of Example I which required only 19 hours of heating.

EXAMPLE III

This example illustrates the effect of a salt, in the absence of heating, when preparing an inhibited starch product according to the process of this invention.

A. 100 Parts of potato starch are suspended in 150 parts water containing 20 percent sodium sulfate. The pH is adjusted to 6.0 and the mixture is placed in a sealed tumbler at 2°–5°C. for one week. Afterwards the starch is thoroughly washed to remove all residual salts and air dried.

B. The treatment in A is repeated, except that the initial pH is adjusted to 2.0 and the pH is raised to 6.0 just before washing to remove the residual salt.

C. The treatment in A is repeated except that the initial pH is adjusted to 10.0, and the pH is lowered to 6.0 just before washing to remove the residual salt.

The products of A, B and C when cooked could not be differentiated from untreated, uninhibited potato starch.

The above results show that the presence of sodium sulfate alone is not enough to yield an inhibited starch product and that an elevated temperature within the prescribed range is required.

EXAMPLE IV

This example illustrates that non-chemical inhibition in accordance with this invention can be brought about in a short time provided the temperature is kept high and the sodium sulfate concentration is sufficiently high to prevent any gelatinization.

100 Parts of potato starch are suspended in 150 parts water which contains 50 percent sodium sulfate. The pH of the mixture is adjusted to 6.0, and thereafter the mixture is placed in a sealed tumbler at 100°C. (in a boiling water bath) for one hour.

The cook showed moderate inhibition.

EXAMPLE V

This example shows that amylose-containing starches other than potato starch are also inhibited, although to lesser degree, by the process of this invention, while amylose-free starches are essentially not so inhibited.

A. Starches of different types were treated as indicated in Example I (Sample A). Brabender comparisons were made and the cooked treated samples were compared with the untreated starches, with the results indicated in Table III.

TABLE III

| Test | Waxy corn Treated | Waxy corn Untreated | Achira Treated | Achira Untreated | Corn Treated | Corn Untreated |
| --- | --- | --- | --- | --- | --- | --- |
| Gelatinization Time (min) | 10.5 | 9.0 | 9.5 | 8.0 | 10.8 | 9.0 |
| Peak viscosity | 1280 | 1260 | — | 2260 | 530 | 605 |
| Peak time (min) | 13.0 | 11.0 | — | 16.0 | 17.0 | 13.5 |
| Visco/0 min. at 95°C. | 1020 | 1040 | 615 | 2050 | 375 | 540 |
| Visc/15 min. at 95°C. | 750 | 510 | 1780 | 1670 | 520 | 530 |
| Visc/30 min. at 95°C. | 600 | 410 | 2040 | 1355 | 520 | 510 |

The inhibition is indicated by a delayed peak time in the case of the treated corn starch, and by the lack of a peak and a higher final viscosity in the case of achira starch. Thus treated corn starch exhibits slight inhibition and treated achira starch exhibits moderate inhibition. In contrast to these amylose-containing root starches, however, essentially amylose-free waxy corn starch shows no inhibition (or very slight inhibition) by the process of this invention.

B. 100 Parts of amylose-containing tapioca starch were suspended in 150 parts water containing 50 percent sodium sulfate. The pH was adjusted to 6.0 and the mixture was placed in a sealed tumbler at 90°C. for 19 hours.

The cook characteristics upon a visual inspection were as follows:

Treated tapioca (hot) : non-cohesive and heavy
Untreated tapioca (hot) : cohesive, phlegmy and moderately heavy
The loss of cohesiveness indicates inhibition in the treated tapioca.

In summary, the process of this invention for inhibiting amylose-containing starches is based on the use of moderate heat and a salt, which serves as an anti-gelatinizing agent, to effect the degree of inhibition desired. This practical approach utilizes an aqueous medium and does not require the use of high pressures to achieve a non-chemical inhibition as proposed by Sair. The salt is washed away to leave a pure starch product. No chemical is combined with the starch which has all the properties of a crosslink inhibited starch.

We claim:

1. A process for preparing a non-chemically inhibited starch comprising the steps of
   a. preparing a suspension comprising
      i. 100 parts of amylose-containing starch in intact granule form,
      ii. 10–60 parts of an inorganic salt effective in raising the gelatinization temperature of said starch; and
      iii. sufficient water to suspend said starch;
   b. maintaining the pH of said suspension at a level of 3 to 9; and
   c. heating said dispersion at a temperature of 50°–100°C. for a period of 0.5 to 30 hours, wherein said inorganic salt is selected from the group consisting of sodium sulfate, ammonium sulfate, magnesium sulfate, potassium sulfate, sodium chloride, potassium chloride, sodium phosphate, potassium phosphate, ammonium chloride and ammonium phosphate.

2. The process of claim 1 wherein said starch contains 18–30 percent amylose based on the total starch weight.

3. The process of claim 1 wherein said starch is a root starch.

4. The process of claim 3 wherein said starch is a potato starch.

5. The process of claim 2 wherein said salt is sodium sulfate or potassium sulfate.

6. The process of claim 2 wherein said suspension contains from 20 to 50 parts of said salt.

7. The process of claim 2 wherein said suspension contains 110–200 parts of water and is heated to a temperature of 60°–90°C.

8. The process of claim 2 wherein said pH is maintained at a level of 4 – 7.

9. The process of claim 1 wherein said heating is performed under atmospheric pressure.

* * * * *